US 6,662,190 B2

(12) United States Patent
Bax et al.

(10) Patent No.: US 6,662,190 B2
(45) Date of Patent: Dec. 9, 2003

(54) LEARNING AUTOMATIC DATA EXTRACTION SYSTEM

(75) Inventors: Eric T Bax, Pasadena, CA (US); Julian Pellico, Agoura Hills, CA (US)

(73) Assignee: iSpheres Corporation, Oakland, CA (US)

( * ) Notice: Subject to any disclaimer, the term of this patent is extended or adjusted under 35 U.S.C. 154(b) by 325 days.

(21) Appl. No.: 09/812,425

(22) Filed: Mar. 20, 2001

(65) Prior Publication Data

US 2002/0138491 A1 Sep. 26, 2002

(51) Int. Cl.$^7$ .............................................. G06F 17/30
(52) U.S. Cl. ....................................... 707/102
(58) Field of Search ......................... 707/102

(56) References Cited

U.S. PATENT DOCUMENTS

| | | | | |
|---|---|---|---|---|
| 4,706,212 A | * | 11/1987 | Toma ............................. | 704/2 |
| 4,864,501 A | * | 9/1989 | Kucera et al. .................. | 704/8 |
| 4,868,750 A | * | 9/1989 | Kucera et al. .................. | 704/8 |
| 5,497,319 A | * | 3/1996 | Chong et al. ................... | 704/2 |
| 5,555,169 A | * | 9/1996 | Namba et al. .................. | 704/9 |
| 5,687,363 A | * | 11/1997 | Oulid-Aissa et al. ........... | 707/4 |
| 5,754,766 A | * | 5/1998 | Shaw et al. ................. | 709/200 |
| 5,832,450 A | * | 11/1998 | Myers et al. ................... | 705/3 |
| 5,963,940 A | * | 10/1999 | Liddy et al. ..................... | 707/5 |
| 5,974,412 A | * | 10/1999 | Hazlehurst et al. ............ | 707/3 |
| 6,018,736 A | * | 1/2000 | Gilai et al. ...................... | 707/6 |
| 6,230,168 B1 | * | 5/2001 | Unger et al. ............... | 715/501.1 |
| 2001/0033205 A1 | | 10/2001 | Kubaitis | |
| 2002/0032740 A1 | | 3/2002 | Stern et al. | |

OTHER PUBLICATIONS

Overview of Vignette® Content Aggregation Server, original publication date unknown, copyright date 1997–2001, from http://www.vignette.com.

White Paper on Vignette® Content Aggregation Server, author Kate Quackenbush, published Feb. 2, 2001, from http://www.vignette.com.

Overview of Liaison Content Exchange 3.0, original publication date unknown, copyright date 2000–2001, from http://www.liason.com.

Overview of the Cohera Content Integration System, original publication date unknown, copyright date 2001, from http://www.cohera.com.

Overview of the Cohera Workbench™, original publication date unknown, copyright date 2001, from http://www.cohera.com.

Overview of Softface, Inc.'s SmartContent product, original publication date unknown, copyright date 2000, from http://www.softface.com.

* cited by examiner

*Primary Examiner*—Wayne Amsbury
(74) *Attorney, Agent, or Firm*—Michael A. Mann; Nexsen Pruet Jacobs & Pollard, LLC

(57) ABSTRACT

An improvement to an automatic data extractor has the capability of discovering new values that are not recognized by the vocabulary of the automatic data extractor and adding them to the record being formed and to the vocabulary, thus accumulating new vocabulary through use. The extractor gleans new values by deducing them from the structure of the text data and learns them by adding them to its vocabulary. The data extractor determines the structure of the data in much the same way as prior art data extractors but then a discovery process is used to identify a series of field lists using preferably at least one field parser and a field grader. The results of the grader are returned to an attribute mapper that identifies the position in the field list for each of the attributes. The content of each field, if not already added to the record and associated with the correct attribute using the recognizer, can now be associated by its position in the field list with an attribute and written to the record as the value for that attribute. Furthermore, a learner assigns that field to the vocabulary list if not already present in the vocabulary.

9 Claims, 3 Drawing Sheets

LEARNING AUTOMATIC DATA EXTRACTION SYSTEM

FIELD OF THE INVENTION

The present invention relates to processing data. In particular, the present invention is related to converting text into data records.

BACKGROUND OF THE INVENTION

Data extraction is the process of converting digital text to digital data records. For example, the text of a web page found on a web site that sells cars may be converted into a set of records, one record for each car that is offered for sale. Each car may be associated with "values" for its attributes of make, model, year, color and price. The set of attributes for a particular car make up the record associated with that car. Some of these attributes may have no value; that is, no value will be assigned to that attribute to indicate merely that no value was extracted from the web page text for that car.

A record for a particular car may include the value "Alpha Romeo" for the attribute of "make"; "red" for the value of the attribute "color"; and "$1900" for the value of the attribute of price. The other attributes, "model" and "year" are left blank.

Converting text information to records is useful because it allows searching, sorting and presenting of the data based on the values of the different attributes. However, not all records come from the same text or are presented in the same text format. Therefore, it is desirable to extract records from a variety of different texts in different formats. Usually, data extraction can be done by using software called a "data extractor" that is tailored to the text format of interest, one extractor for each type of text format. Alternatively, it is possible to develop a data extractor that deduces the format of the source text and then uses that format to guide it in extracting records. These data extractors are referred to as "automatic data extractors." Automatic data extractors can be used on texts from different sources or on texts from the same source but where that text format may change from time to time.

In order to deduce the format of a newly encountered text, the automatic data extractor may use its knowledge of the attribute values and various other formats. Knowledge of attribute values, referred to as "domain knowledge" may be contained in a vocabulary list stored in the memory of a computer or digital storage device. To use the example given above, domain knowledge of color values of cars may include not only colors such as "red", "blue" and "green" but a list of color labels such as "color" and "coloring."

Referring now to FIG. 1, which depicts a schematic view of a prior art automatic data extractor, automatic data extractors may use focuser procedures to identify regions of interest in text that is read in. These procedures include vocabularies of "recognizers" to identify attribute values and labels in texts. To identify various formats, automatic data extractors use "focus parsers" or "parsers". Parsers identify regions in a source text where the text may contain attribute values. Recognizers can be use to evaluate regions of text identified by parsers. Because different parsers may be more appropriate for a given region of text known to have attribute values, the results provided by different parsers must be evaluated or "graded" for their appropriateness. The focus procedures that grade parsers in this way are called "focus graders" or "graders." Thus, focuser procedures include three components: recognizers, parsers and graders. Recognizers are used by parsers to identify attribute values in a source text. Then, graders are used to determine which parser produced results that best fit the text.

For example, suppose the source text is a web page that contains a banner advertisement, several pages of free text, and a table that contains record data. The goal of the focuser procedure is to identify the region of interest; here, the table. First, each focus parser is applied to the text. One focus parser may identify the free text and another may identify the table. The first parser returns the free text region; and the second one, the table region. The focus grader is applied to both regions returned. The graders determine which region contains the most attribute values, or the most attribute values and labels, or the most attribute values and labels per number of words in the region, depending on the grading algorithm. The region that achieves the highest grade becomes the "region of interest."

Automatic data extractors may also contain segmenter procedures that include segment parser and segment grader components. Segmenter procedures are designed to identify a series of "record regions" in the text that each contain data for a single record. If the region of interest is a table, each row of the table may include the attribute values of a record and thus be a record region.

After a region of interest has been identified, segmenter parsers are applied to it. The first parser may return each cell as a record region; the second, each row; and the third, each column. Then the segmenter grader is applied. Recognizers are again used by the graders to evaluate the different record regions returned. The graders apply the programmed algorithm which may penalize record regions returned that have fewer than one or more than one value per attribute. As before, the series of record regions that returns the best grade becomes the series of interest.

Once the record regions are identified, automatic data extractors produce records as follows. For each record region, a record is formed with all the attributes initially having no values. Then for each attribute, if there is at least one recognized value in the record region, that value becomes the record value. That first value is "extracted" from the text and entered into the data record.

This kind of automatic data extractor relies heavily on the domain knowledge in its vocabulary lists. The more comprehensive the list of recognizers, the better will be the deduction of source text information and the more complete the data records. Therefore, having a larger vocabulary list is better. However, building a large vocabulary list is labor intensive. Furthermore, vocabulary changes in time. New values come into existence and old values become out of date. Thus not only is building a large list labor intensive, so also is maintaining an up-to-date list. Thus there remains a need for a better way to develop and maintain vocabulary lists in automatic data extractors.

SUMMARY OF THE INVENTION

The present invention is a method for increasing the vocabulary of an automatic data extractor and it is also an automatic data extractor that automatically learns new vocabulary. The present automatic data extractor increases its vocabulary by learning as it is applied to extract data records from text. An automatic data extractor that learns new vocabulary can extract more data records from text. The present automatic data extractor uses domain knowledge to deduce data structure, then uses both the new structure and domain knowledge to extract new values not previously in its vocabulary and adds them to the records and to its vocabulary.

The method includes procedural components in addition to those in prior art data extractors, namely, field parsers and field graders. Each field parser is applied to a series of record regions to create a candidate series of field lists. Then the field grader uses recognizers to choose a single best series of field lists from the various candidates created by the field parsers. Next, an attribute mapper is applied to the selected series of field lists to determine the positions of the attributes in the list. Once it is known that a particular attribute corresponds to a particular position in the field lists, the fields in that position of the field lists are written as the attribute values to the corresponding record whether they are in the vocabulary list or not. In this way, new values of attributes are deduced or "gleaned" from a text source. If a field is not in the vocabulary list, it is added to the vocabulary list. Thus, the data extractor learns new vocabulary values through use.

An important advantage of the present invention is that it is able to produce a more complete record than prior art automatic data extractors because it deduces new attribute values not previously in its vocabulary. Just as importantly, it is able to add these new attribute values to that vocabulary to increase the size of its vocabulary automatically.

These and other features and advantages of the present invention will become apparent to those skilled in the art of data extraction from a careful reading of the Detailed Description of Preferred Embodiments accompanied by the following drawings.

BRIEF DESCRIPTION OF THE DRAWINGS

In the figures.

DETAILED DESCRIPTION OF PREFERRED EMBODIMENTS

Figure 1:
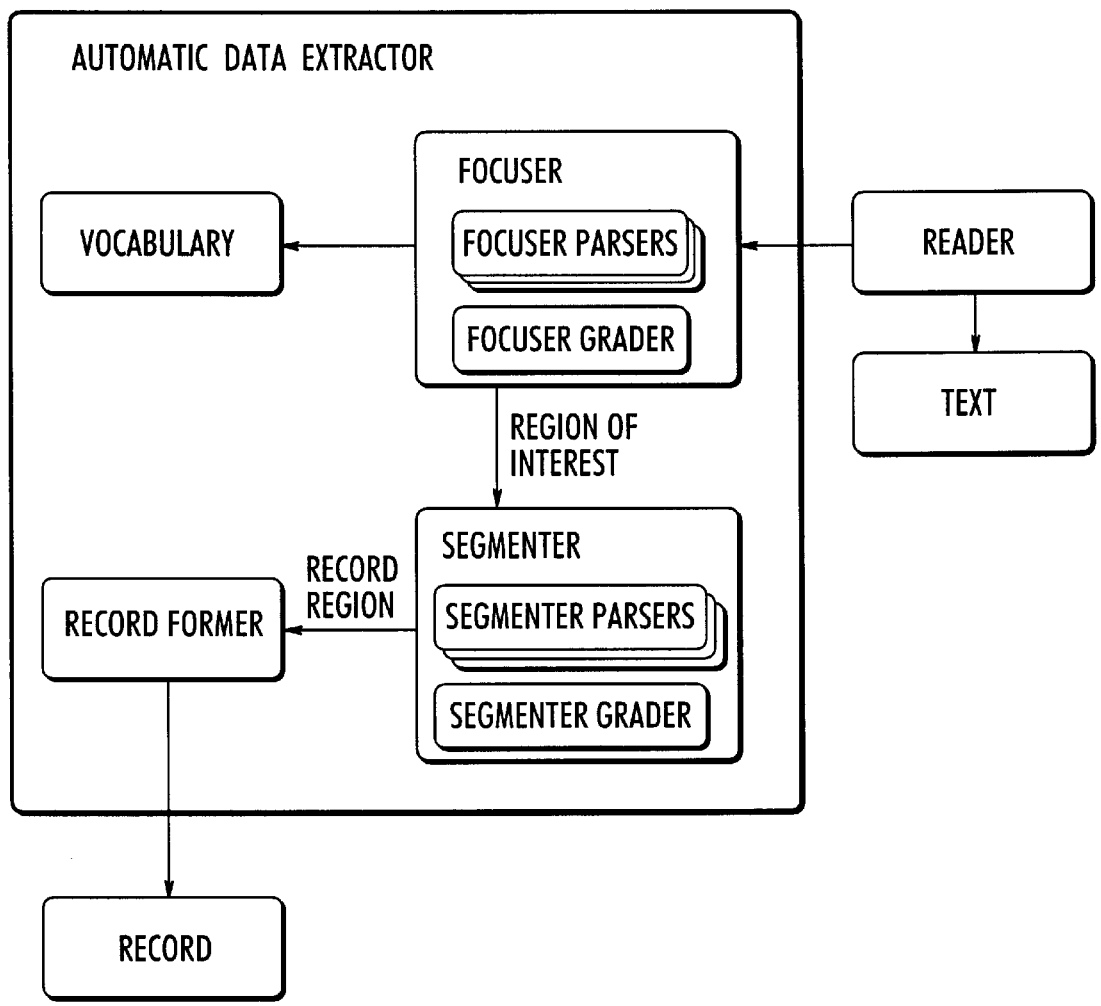
FIG. 1 illustrates a prior art automatic data extractor.
Figure 2:
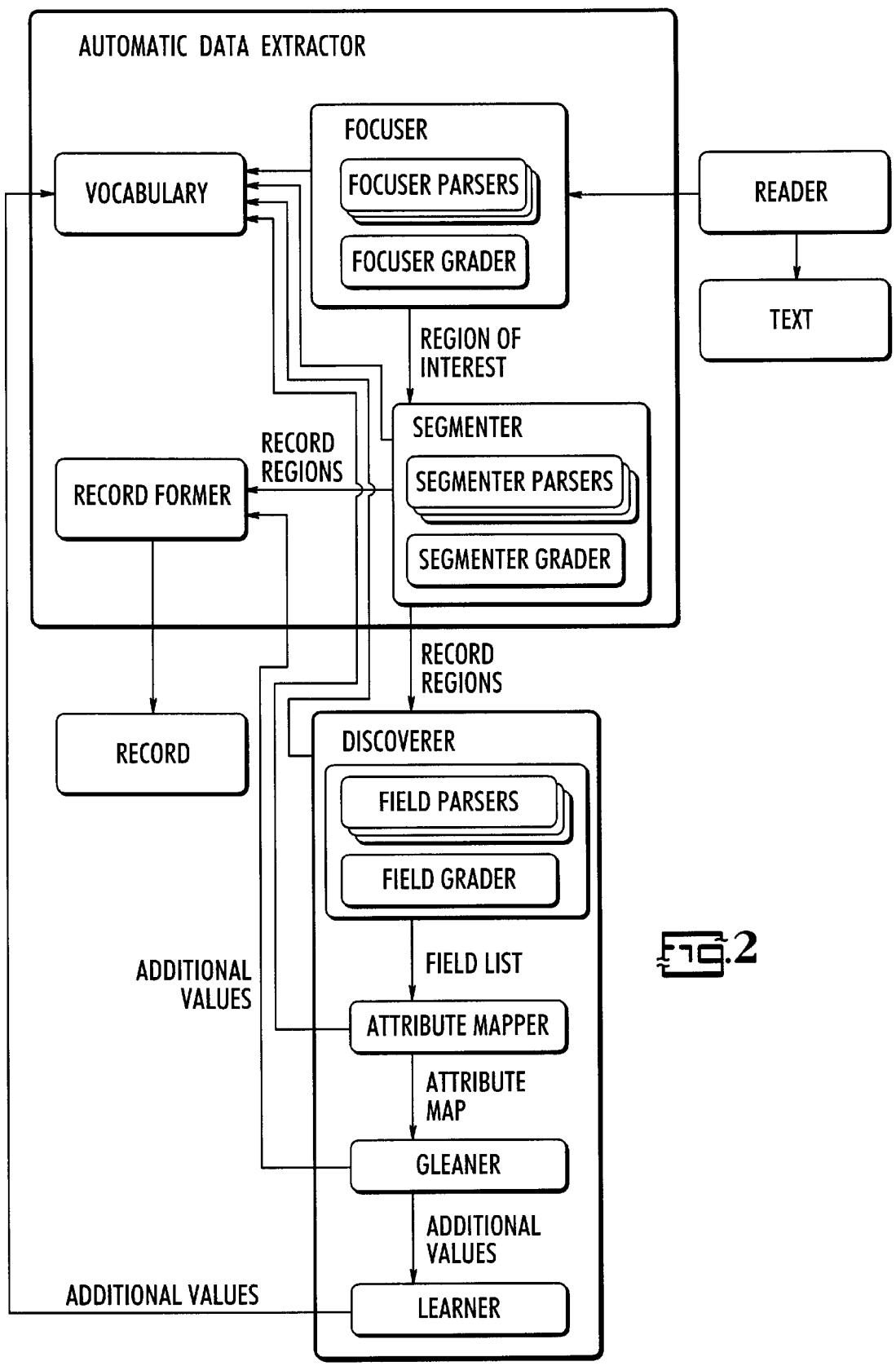
FIG. 2 illustrates a learning data extractor, according to a preferred embodiment of the present invention.
Figure 3:
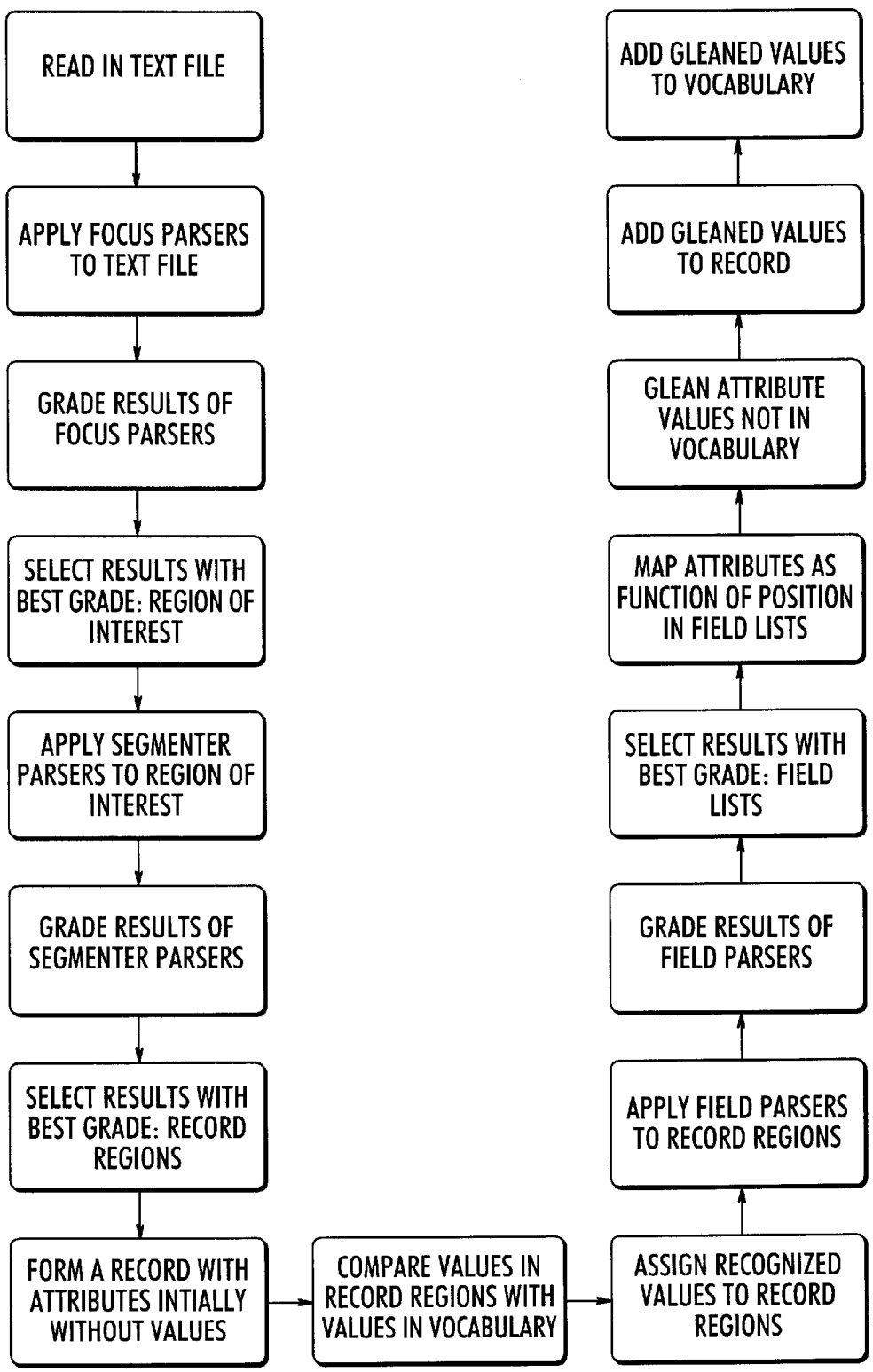
FIG. 3 illustrates a flow chart for a learning data extractor, according to a preferred embodiment of the present invention.

The present invention is a learning automatic data extractor. It extracts data records from text that contain data in a format not known a priori, identifies attribute values both previously known and unknown to it for the data record, and adds new attribute values to its vocabulary. The present invention is an improvement to the prior art automatic data extractors described in the Background of the Invention. The improvement is characterized by the capability (1) to glean new attribute values not in the pre-existing vocabulary by deducing them from data records after the structure of the data format is itself deduced and (2) to learn new vocabulary by adding new attribute values to the pre-existing vocabulary. Certain terms used herein are important to the understanding of the present invention.

Attributes are the types of characteristics that can be used to describe information or things. For example, cars can be characterized by the following attributes: make, model, year, color, price, milage, options and condition. An article in a magazine can be characterized by the following attributes: length, subject, title, author, name of publication, date of publication, and starting page.

Given a particular attribute, its values run the range of examples that attribute can take on. For example, the attribute of color can take on values such as red, green, blue or yellow; the attribute of the year of an automobile can be any year in the past 100 years. The attribute values for a particular car or magazine article would comprise a record for that car or article.

Text refers to information presented in alphanumeric or digital form as opposed to, for example, images. In a text, there may be several regions. There may be a region that includes a table, for example. The table may contain attribute values for several types of information or things. That region may be considered to be a region of interest within that text.

A region of interest, and in particular a region containing a table, may include several record regions, such as several rows or columns of a table, each row or column being a separate record region and the series of record regions comprising the whole table. Each record region will contain several fields. The field is the content of a part of the record region assigned to an attribute and may contain a value. The list of fields is the set of all the attributes in a record region. A field may contain a value for the attribute assigned to that part of the record region if the contents of a field correspond to an attribute value.

For example, a table of cars by year, make and model, may be a region of interest in a text. Each row in the table is a record region and each record region may contain the year, make and model of a particular car. The list of fields will then be the year, make and model, and, for a particular car, those fields may contain the values of 1997, Chrysler, Town & Country because these are values of year, make and model, respectively.

The process of parsing and segmenting means to identify or determine the structure of text. Graders are used to increase the likelihood that the structure identified is correct or more likely than not to be correct. Gleaning is the process of deducing values from text when the values are not identified by recognizers. In gleaning, the deduction is made, from the structure of the data and its contents, that the fields in the data correspond to particular attribute values. In parsing, segmenting and gleaning, a vocabulary of recognizers is used to deduce new records. Learning means the process of using the gleaned records to enhance the vocabulary of the automatic data extractor when it is next applied to text.

In order to describe the present invention better, an example will be given first.

Suppose a source text is a web site and the text corresponding to the region of interest is a string of text in hypertext mark up language (html) as follows:

<html>

<ol>

<li> BUY HERE, BUY NOW

<li> call 1-800-BUY-CARS

<li> Open 24-7, No Hassle

</ol>

<table>

<tr>

<td> 1988 </td>

<td> Yugo </td>

<td> ZLM </td>

<td> red </td>

<td> $800 </td>

<td> orange racing flames painted on hood </td>

</tr>

<tr>

```
<td> 1995 </td>
<td> Jeep </td>
<td> Grand Cherokee </td>
<td> blue </td>
<td> $10,500 </td>
<td> runs well </td>
<tr>
<td> 1999 </td>
<td> Volkswagen </td>
<td> Beetle </td>
<td> iris </td>
<td> $20,000 </td>
<td> good as new </td>
</tr>
</table>
```
These are great autos! Buy one today.
```
</html>
```
Assume that a learning data extractor has been programmed to produce records on cars for sale with the attributes of make, model, year, color, and price. Assume that there are suitable vocabulary lists for make, model, year, and color but the recognizer for price uses a text pattern instead of a vocabulary list. Assume that the vocabulary list of values for the attribute of "make" includes "Jeep" and "Volkswagen" but not "Yugo"; that the vocabulary list of values for model includes "Grand Cherokee" and "Beetle" but not "ZLM"; that the vocabulary list of values for the attribute of "color" includes "red" and "blue" but not "iris"; and that the vocabulary list of values for the attribute of year is suitably complete.

The focuser identifies the table and its contents as the region of interest and the segmenter identifies the table rows as the series of record regions. Then the learning automatic data extractor produces the following data records:

make: " " model: " " year: "1988" color: "red" price: "$800"

make: "Jeep" model: "Grand Cherokee" year: "1995" color: "blue" price: "$10,500"

make: "Volkswagen" model: "Beetle" year: "1999" color: "" price: "$20,000"

Assume that one of the field parsers identifies the contents of the html table cells as fields and that the field grader selects this parser. Thus, the field lists are as follows.

"1988", "Yugo", "ZLM", "red", "$800", "orange racing flames painted on hood"

"1995", "Jeep", "Grand Cherokee", "blue", "$10,500", "runs well"

"1999", "Volkswagon", "Beetle", "iris", "$20,000", "good as new"

The attribute mapper uses the recognizers to determine that the attribute of "make" corresponds to the second position; the attribute of "model", to the third position; the attribute of "year", to the first position; the attribute of "color", to the fourth position; and the attribute of "price", to the fifth position. The learning automatic data extractor uses this information to deduce that "Yugo" is a make value, "ZLM" is a model value and "Iris" is a color value, and augments the data records accordingly. Now the augmented records appear as follows:

make: "Yugo" model: "ZLM" year: "1988" color: "red" price: "$800"

make: "Jeep" model: "Grand Cherokee" year: "1995" color: "blue" price: "$10,500"

make: "Volkswagen" model: "Beetle" year: "1999" color: "iris" price: "$20,000"

The learning automatic data extractor then identifies the values that were not in the original data records but are in the augmented records ("Yugo", "ZLM", and "iris") and adds them to the vocabulary of recognizers associated with the corresponding attributes ("make", "model", and "color", respectively).

The learning data extractor includes an automatic data extractor component and a discoverer component. The automatic data extractor includes a list of attribute names, attribute recognizers, a focuser and a segmenter. The focuser includes both focus parsers and a focus grader. Similarly, the segmenter includes both segmenter parsers and a segment grader.

The discoverer component includes field parsers, a field grader, an attribute mapper, a gleaner and a learner.

In processing text, a computer will first read in text from a text source. The automatic data extractor (previously read into the computer) will then be applied to produce record regions and records as in the automatic data extractors of the prior art. Then the discoverer component will be applied by first using the field parsers to develop several candidate field list series. A best field list series is obtained from these candidate field list series by applying the field grader. Next, the attribute mapper is applied to the best field list series to determine which attribute maps to which position in the field list. The gleaner augments the records developed by the automatic data extractor with additional values deduced from the results returned by the attribute mapper, and the learner augments the vocabularies of attribute values with the additional values. The output is the augmented data records and the augmented vocabulary of the data extractor.

Not all values that might be learned are desired vocabulary list elements. For example, attribute labels may be discovered and learned as values if the labels occur in a header region that has a similar structure to the other record regions. One remedy is to check that fields are not recognized labels before inserting the fields into the vocabulary list in the learner process. Another remedy is to check the vocabulary lists on occasion and remove the undesired entries. Yet another remedy is to store new vocabulary in a temporary list instead of a vocabulary list, then occasionally clean out undesired entries and add the temporary list to the vocabulary list.

There are many ways to enhance the basic implementation described above. One way is to use a weeder process to removed the undesired records from the series of records before they are written out. The process may employ different rules to determine which records to remove. For example, records with all attribute values blank can be removed. Also, records with one or more standard deviations fewer than the average number of attribute values can be removed.

It will be apparent to those skilled in data extraction that other modifications and substitutions can be made to the learning data extractor described in the preferred embodiments without departing from the spirit and scope of the present invention, defined by the appended claims.

What is claimed is:

1. A method for data extraction of a text file to a record file, said method comprising the steps of:

(a) identifying an area of interest in a text file;

(b) parsing said area of interest in order to identify a list of values of attributes in said area of interest;

(c) recognizing a first set of values in said list that match values contained in an attribute value vocabulary;

(d) forming a record using said first set of values;

(e) gleaning a second set of values in said list that do not match values contained in said attribute value vocabulary; and (g) adding said second set of values to said record.

2. The method as recited in claim 1, further comprising the step of adding said second set of values to said attribute value vocabulary.

3. The method as recited in claim 2, further comprising the steps of:

adding said second set of values to a temporary memory; and purging undesired values from said second set of values.

4. The method as recited in claim 1, wherein said parsing step produces plural lists and wherein said method further comprises the step of grading said plural lists to identify said list of values.

5. The method as recited in claim 1, wherein said gleaning step further comprises the step of mapping said list of values of attributes to a set of attributes in order to determine a position of each attribute in said list.

6. The method as recited in claim 5, wherein said first set of values is used to identify said position.

7. The method as recited in claim 1, further comprising the step of:

purging undesired values from said second set of values.

8. A data extractor, comprising:

means for identifying a region of interest;

an attribute value vocabulary;

field parsing means for identifying a list of values of attributes in said region of interest;

recognizer means for recognizing values in said list of values that match values contained in said attribute value vocabulary;

gleaning means for identifying values in said list of values that do not match values contained in said attribute value vocabulary;

means for forming a record; and means for adding values to said record from said recognizer means and said gleaning means.

9. The data extractor as recited in claim 8, wherein said identifying means further comprises:

at least one focus parser; and a focus grader, each focus parser of said at least one focus parser identifying a potential region of interest and said focus grader grading said potential region of interest.

\* \* \* \* \*